UNITED STATES PATENT OFFICE.

SERVETUS T. ACHOR, OF KENNETT SQUARE, PENNSYLVANIA.

PROCESS OF PREPARING EMULSIFIED CHOCOLATE.

982,779.  Specification of Letters Patent.  Patented Jan. 31, 1911.

No Drawing.   Application filed May 14, 1910.  Serial No. 561,321.

*To all whom it may concern:*

Be it known that I, SERVETUS T. ACHOR, a citizen of the United States, residing at Kennett Square, in the county of Chester and State of Pennsylvania, have invented certain new and useful Improvements in Processes of Preparing Emulsified Chocolate, of which the following is a specification.

This invention relates to the process of preparing an emulsified chocolate product, said product having the cocoa-butter in an emulsified condition with the other natural constituents of chocolate and with added sugar and milk, in convenient and agreeable form for preparing a nutritious beverage, or for use in making confectionery.

The object of my invention is to prepare a highly nutritious, and an easily digestible and assimilable chocolate product, containing all the constituents of high grade chocolate and in which the oily portion or cocoa-butter is thoroughly emulsified with liberated starch, the other natural cocoa constituents and with added sugar and milk, in suitable proportions for making an agreeable beverage by addition of hot water, or for making various kinds of confections.

My soluble emulsified chocolate is preferably in dry, granular condition, comparatively soft, porous and friable, and instantly soluble in hot water or milk for producing a delicious, refreshing beverage.

The unsweetened or bitter chocolate of commerce contains starch, albuminoids, other carbohydrates, oil and theobromin in suitable proportions to make an exceedingly nutritious and mildly stimulating article of diet, but such bitter chocolate is not in satisfactory or convenient condition for general domestic use. The unscientific methods now used in preparing chocolate or cocoa for a beverage have the effect of liberating the oil and causing it to rise to the top of the fluid mixture in the form of large floating globules. This liberated oily portion, besides being difficult of digestion is objectionable in appearance. If a chocolate beverage thus prepared is freely and frequently indulged in, it tends to distress the stomach and cause skin eruptions. I therefore so prepare the chocolate as to completely emulsify the oil, diffusing it in a minutely divided condition throughout the other ingredients of the preparation, so that it is occluded and held in a permanent emulsified condition. In this finely divided and diffused condition the oil is easily digestible and assimilable, and does not appear in objectionable globules in the prepared beverage.

In preparing my emulsified chocolate, I take of commercial bitter chocolate about fifty pounds, suitably broken into lumps, and melt the same at a low temperature, from 100° to 110° F., preferably in a pan over a water-bath, or in a steam-jacketed vessel, and when suitably melted add about seventy-five pounds of sugar, preferably granulated cane sugar, and thoroughly mix and incorporate it in granular form with the melted chocolate. This operation is continued, with a suitable stirring and mixing apparatus, for about ten to twenty minutes, at a low temperature, before the sugar is melted, and until the grains are uniformly mixed through the mass of material, with the result that the cocoa-butter, or oil, is minutely divided and spread in thin films on the grains or small particles of sugar. This result having been attained, there is added a suitable proportion of milk. I have obtained the most satisfactory results by using unsweetened, evaporated or condensed milk, of such a density that one quart equals about three to four quarts of straight sweet milk. To the above proportions of chocolate and sugar, I add about twenty quarts—forty to fifty pounds—of condensed milk. By continued agitation, and at the above stated temperature, the condensed milk is thoroughly mixed with the other ingredients of the mass while in a semi-liquid or plastic condition. As the temperature is gradually raised to a suitable degree, preferably about 212 degrees Fahrenheit, the starch cells of the cocoa become swollen and burst, liberating the starch. This liberated starch immediately absorbs the minutely divided cocoa-butter or combines with it to form a fixed emulsion.

The albumin of the milk becomes coagulated by action of the heat and during such operation entangles and holds the finely divided and diffused oil and assists in making the emulsion permanent. The natural albuminoids of the chocolate and the added albumin of milk, being in relatively large proportion, have the beneficial effect of neutralizing the astringent bitter property of the chocolate, thus overcoming the tendency thereof to produce constipation and other disorders of the digestive organs.

A perfect emulsion having been produced and made permanent by the action of the liberated starch and albuminous material, the heat and agitation are continued at a low temperature to a sufficient extent to cause slow evaporation of the moisture and reduce the mass to a viscous condition. The heat is now shut off from the vessel, but the stirring operation is preferably continued until the mass is brought to a creamy condition, so that when cooled it will readily crumble. The product is then removed from the vessel and is preferably spread in layers from one inch to an inch and a half thick and allowed to cool and dry.

The dry layers or cakes are porous and friable and can be readily comminuted; they are reduced to a granular condition by a suitable mill. Being dry, and containing the requisite proportion of sugar, the grains, or other forms of the product, do not require any protective coating to preserve them, but the product is preferably put up in air tight jars or cans for preserving the fine aroma and flavor.

By my process a product is produced having the agreeable odor and flavor characteristic of the best chocolate or cocoa. The starchy and albuminous constituents being thoroughly cooked, and the product containing the requisite proportions of sugar and milk, a delicious and refreshing beverage may be made by simply adding the granular emulsified chocolate to hot water, in which it is instantly soluble. The advantages of the thorough emulsification of the oil in a fixed condition are apparent when the product is dissolved in water, as the resulting beverage will be of agreeable appearance and free from oily globules.

By conducting the process at or near the described temperatures, I avoid all tendency to injure the appearance and fine flavor of the resulting product.

Though straight sweet milk may be added to the batch of melted chocolate and sugar and the batch then subjected to stirring and evaporation as above described, I prefer to use the evaporated or condensed unsweetened milk in order to shorten the operation of cooking the chocolate and, further, to make a product richer in milk constituents and, therefore, more nutritious and valuable as a food.

The above described emulsified chocolate product is made the subject of claims in a co-pending application, Serial Number 495,721, and therefore the product is not herein claimed.

Having described my invention, what I claim, and desire to secure by Letters Patent, is—

1. The process of preparing emulsified chocolate, which consists in mixing chocolate and sugar at the proper temperature for melting chocolate, to minutely divide the cocoa-butter or oil and spread it in thin films on the grains or particles of sugar, adding milk, stirring and heating the mass till the starch cells of the cocoa become swollen and burst, thereby liberating the starch, and stirring till the cocoa butter is absorbed by, or combined with the liberated starch and emulsification is effected.

2. The process of preparing emulsified chocolate, which consists in thoroughly mixing melted chocolate and sugar at a temperature of about 110 degrees Fahrenheit to minutely divide the cocoa-butter or fat and spread it in thin films on the grains of sugar, adding evaporated or condensed milk, heating the mass sufficiently to burst the starch cells, and stirring till the cocoa-butter is thoroughly emulsified.

3. The process of preparing emulsified chocolate, which consists in thoroughly mixing sugar with melted chocolate at a temperature of about 110 degrees Fahrenheit, to minutely divide and spread the cocoa-butter in thin films on the grains or particles of sugar, adding evaporated or condensed milk and continuing the heat and agitation till the starch cells of the cocoa burst and the liberated starch absorbs or combines with the cocoa-butter and emulsification of the latter is effected.

4. The process of preparing emulsified chocolate, which consists in thoroughly mixing sugar with melted chocolate at a temperature slightly above 100 degrees Fahrenheit, to minutely divide and spread the cocoa-butter in thin films on the grains or particles of sugar, adding condensed milk and continuing the heat and agitation till the starch cells of the cocoa burst and the liberated starch absorbs or combines with the cocoa-butter and emulsification of the latter is effected, then drying and granulating the product.

5. The process of preparing emulsified chocolate, which consists in mixing the chocolate and sugar at the proper temperature for melting chocolate, to minutely divide the cocoa-butter and spread it in thin films on the grains or particles of sugar, separately evaporating milk to the desired density and adding the resulting product to, and stirring it with, the chocolate and sugar mixture, heating to an increased temperature to burst the starch cells and stirring till emulsification of the cocoa-butter with the other constituents of the mass is effected in substantially permanent condition.

In testimony whereof I affix my signature in presence of two witnesses.

SERVETUS T. ACHOR.

Witnesses:
MABEL A. PUSEY,
ANNIE COOPER.